United States Patent
Stover, Jr. et al.

(10) Patent No.: US 8,776,928 B2
(45) Date of Patent: Jul. 15, 2014

(54) REGENERATIVE ELECTRIC DRIVE REFRIGERATED UNIT

(75) Inventors: A. Blair Stover, Jr., Platte City, MO (US); Richard Leonard Barrett, Kansas City, MO (US)

(73) Assignee: ENGEN Technologies, Riverside, MO (US)

( * ) Notice: Subject to any disclaimer, the term of this patent is extended or adjusted under 35 U.S.C. 154(b) by 1472 days.

(21) Appl. No.: 12/343,725

(22) Filed: Dec. 24, 2008

(65) Prior Publication Data
US 2010/0154449 A1    Jun. 24, 2010

(51) Int. Cl.
*B60K 25/08* (2006.01)

(52) U.S. Cl.
USPC .......................... 180/165; 180/2.1; 180/65.31

(58) Field of Classification Search
USPC ............ 180/165, 65.21, 65.31, 305, 306, 2.1, 180/11, 12, 13; 62/236, 239, 233.3
See application file for complete search history.

(56) References Cited

U.S. PATENT DOCUMENTS

| | | | |
|---|---|---|---|
| 4,134,272 A | 1/1979 | Reimann | |
| 4,271,677 A | 6/1981 | Harr | |
| 4,441,573 A | 4/1984 | Carman | |
| 4,657,289 A * | 4/1987 | Boyer | 290/1 R |
| 4,702,090 A | 10/1987 | Barclay | |
| 4,720,980 A | 1/1988 | Howland | |
| 4,735,055 A | 4/1988 | Taylor | |
| 4,748,824 A | 6/1988 | Wakabayashi | |
| 4,759,190 A | 7/1988 | Trachtenberg | |
| 4,780,618 A | 10/1988 | Wareman | |
| 4,899,549 A | 2/1990 | Berge | |
| 5,056,330 A | 10/1991 | Isobe | |
| 5,186,015 A | 2/1993 | Roehrich | |
| 5,265,435 A | 11/1993 | Richardson | |
| 5,376,877 A | 12/1994 | Kern | |
| 5,487,278 A | 1/1996 | Hilleveld et al. | |
| 5,489,001 A | 2/1996 | Yang | |
| 5,557,938 A | 9/1996 | Hanson | |
| 5,582,262 A | 12/1996 | Wust | |
| 5,847,470 A | 12/1998 | Mitchell | |
| 5,916,253 A | 6/1999 | Amr | |
| 5,960,637 A | 10/1999 | Stevens | |
| 6,044,651 A | 4/2000 | Reason | |
| 6,223,546 B1 | 5/2001 | Chopko et al. | |
| 6,423,275 B1 | 7/2002 | D'Souza | |
| 6,484,832 B1 | 11/2002 | Morisawa | |
| 7,514,803 B2 * | 4/2009 | Wilks | 290/1 A |
| 2002/0108388 A1 | 8/2002 | Wilson | |
| 2002/0157414 A1 | 10/2002 | Iwanami | |
| 2002/0162344 A1 | 11/2002 | Reason | |

(Continued)

FOREIGN PATENT DOCUMENTS

| | | |
|---|---|---|
| EP | 1046525 A2 | 10/2000 |
| EP | 1046525 A3 | 6/2002 |
| WO | WO2007085126 A1 | 8/2007 |

*Primary Examiner* — John Walters
(74) *Attorney, Agent, or Firm* — Christopher A. Taravella

(57) ABSTRACT

The present invention affords a regenerative electric drive refrigerated unit for a conveyance vessel, thereby providing temperature cooling in a compartment of the conveyance vessel. An electricity generator powers a compressor unit in the refrigeration unit. The electricity generator is powered by a drive mechanism obtaining its energy from the motion of the conveyance vessel such that when the invention is employed, a diesel engine that normally powers the compressor unit in the refrigeration unit is disabled and stops running, thereby saving energy and reducing air pollution otherwise generated by the burning of fossil fuels when the diesel engine is running.

2 Claims, 5 Drawing Sheets

(56) References Cited

U.S. PATENT DOCUMENTS

| | | |
|---|---|---|
| 2003/0019231 A1 | 1/2003 | Wessells |
| 2003/0031906 A1 | 2/2003 | Cargnelli |
| 2003/0107349 A1 | 6/2003 | Haydock |
| 2004/0026927 A1 | 2/2004 | Stevenson et al. |
| 2004/0124023 A1 | 7/2004 | Plishner |
| 2004/0163863 A1 | 8/2004 | Beck |
| 2005/0091988 A1 | 5/2005 | Stewart |
| 2005/0184528 A1 | 8/2005 | Storm |
| 2007/0095586 A1 | 5/2007 | Luedtke |
| 2007/0186573 A1* | 8/2007 | Ziehr et al. ............... 62/236 |
| 2007/0204639 A1 | 9/2007 | Harrison |
| 2007/0209378 A1 | 9/2007 | Larson |
| 2007/0284165 A1* | 12/2007 | Patterson ............... 180/65.3 |
| 2008/0174174 A1* | 7/2008 | Burns et al. ............. 303/152 |
| 2009/0229288 A1* | 9/2009 | Alston et al. ............. 62/236 |

* cited by examiner

REGENERATIVE ELECTRIC DRIVE REFRIGERATED UNIT

BRIEF SUMMARY OF THE INVENTION

The Regenerative Electric Drive Motor Unit is a system that provides "green power" to certain transport trailers or other conveyance vessels requiring on-board refrigeration systems. The power is created by either of the embodiments as more fully set forth herein: a third member differential mounted regenerative motor that draws power from the revolutions of one or more wheels of the transport trailer or conveyance vessel and in turn powers an electricity generator; or a separate trailing wheel or wheels mounted under a carriage of the trailer or conveyance vessel, raised and lowered with a pneumatic or hydraulic lift system, the rotation of which when in contact with a road surface power an electricity generator. Both embodiments readily can be adapted to fit new and existing transport trailers or conveyance vessels.

Both embodiments power an on-board electricity generator via a transmission/gearbox that supplies electrical power to the on-board refrigeration system, thereby providing cooling to a compartment in the transport trailer or conveyance vessel. Alternative power is supplied by an existing diesel engine, used as a back-up, found in transport trailers or other conveyance vessels requiring on-board refrigeration systems. The invention provides for alternating the power source between the electricity generator and diesel engine power. During road operation, the refrigeration system draws power from the electricity generator without running the diesel engine, thereby significantly reducing fuel expense and air pollution associated with the operation of the refrigeration system when powered by the diesel engine.

BACKGROUND OF THE INVENTION

1. Field of the Invention

Refrigeration units of certain freight transportation units, for example, tractor/trailer combinations or other conveyance vessels, currently use independent power supplies for said refrigeration systems. For example, the refrigeration system of a tractor/trailer combination that provides refrigeration for a compartment in the trailer unit is provided power with an independent engine, often diesel-powered. Thus, both the tractor and the refrigeration unit of the trailer are independently powered. This current requirement for independent powering is inefficient and requires the burning of fossil fuels to power both the tractor and the trailer refrigeration system. Tapping the resources of the energy provided by the motion of the tractor/trailer unit results in substantial energy savings and reduction of air pollution in the environment.

The current invention taps the energy of the motion of the tractor/trailer combination or other conveyance vessel in that an electricity generator powered by the rotation of a wheel or wheels in contact with the road surface generates the electricity required for the refrigeration system. The invention described herein can be adapted to any refrigeration system, including without limitation refrigeration systems for railroad cars, similar to those employed on the trailer of tractor/trailer units. In addition, the invention described herein may be applied to any vehicle that operates on or requires battery power or electrical energy in excess of the electrical energy created by the battery or other electrical energy source.

2. Description of Related Art

Patent Application US 2004/0026927 A1, Stevenson et al., describes a fly-wheel-based regenerative energy management system having an integrated fly-wheel-motor-generator coupled to a system controller and further coupled to a drivetrain motor-generator for use in a hybrid vehicle. The invention described therein enables a vehicle to capture the kinetic energy resulting from a braking event, store this energy, and then re-use the stored energy for subsequent vehicle acceleration.

U.S. Pat. No. 6,223,546 B1, Chopko et al., describes an electrically powered transport refrigeration unit comprised of a synchronous generator, a compressor drive motor, and at least one fan motor. The compressor drive motor and fan motor are directly coupled to the generator. A diesel engine supplying energy to the refrigeration unit directly drives the generator.

U.S. Pat. No. 5,487,278, Hilleveld et al., describes a back-up switching system for refrigerator trucks that restarts a diesel engine associated with a refrigerator compressor on a refrigerator trailer to operate the compressor when there is a failure of either a standby motor or alternating current voltage power supply energizing the standby motor.

U.S. Pat. No. 5,489,001, Yang et al., describes a differential coupling and compound power system for a vehicle. The invention therein described is directed to a driving system that incorporates a primary gyroscopic power source and a magnetic coupling and driving device that can be used to individually or simultaneously control the output of the drive vehicle.

BRIEF DESCRIPTION OF THE SEVERAL VIEWS OF THE DRAWINGS

For purposes of simplicity and clarity and not by way of limitation, the invention described herein will be described in conjunction with a tractor/trailer combination. The device and methods described herein may, however, be applied to any type of conveyance vessel using a refrigeration unit. Accordingly, the drawings herein referenced are directed to a tractor/trailer combination.

DETAILED DESCRIPTION OF THE INVENTION

Figure 1:
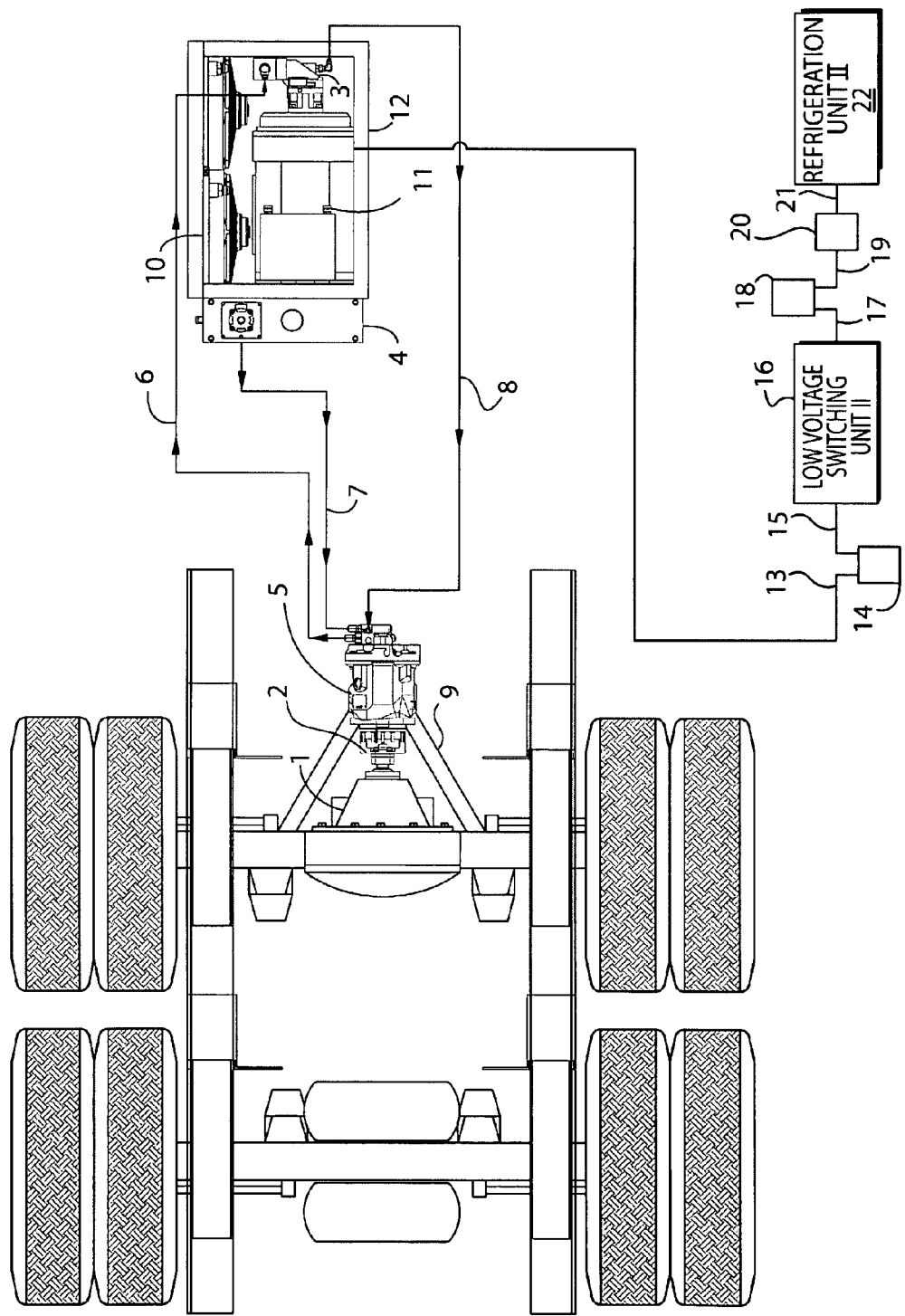
FIG. 1 is a plan view of the preferred embodiment of the invention.
Figure 2:
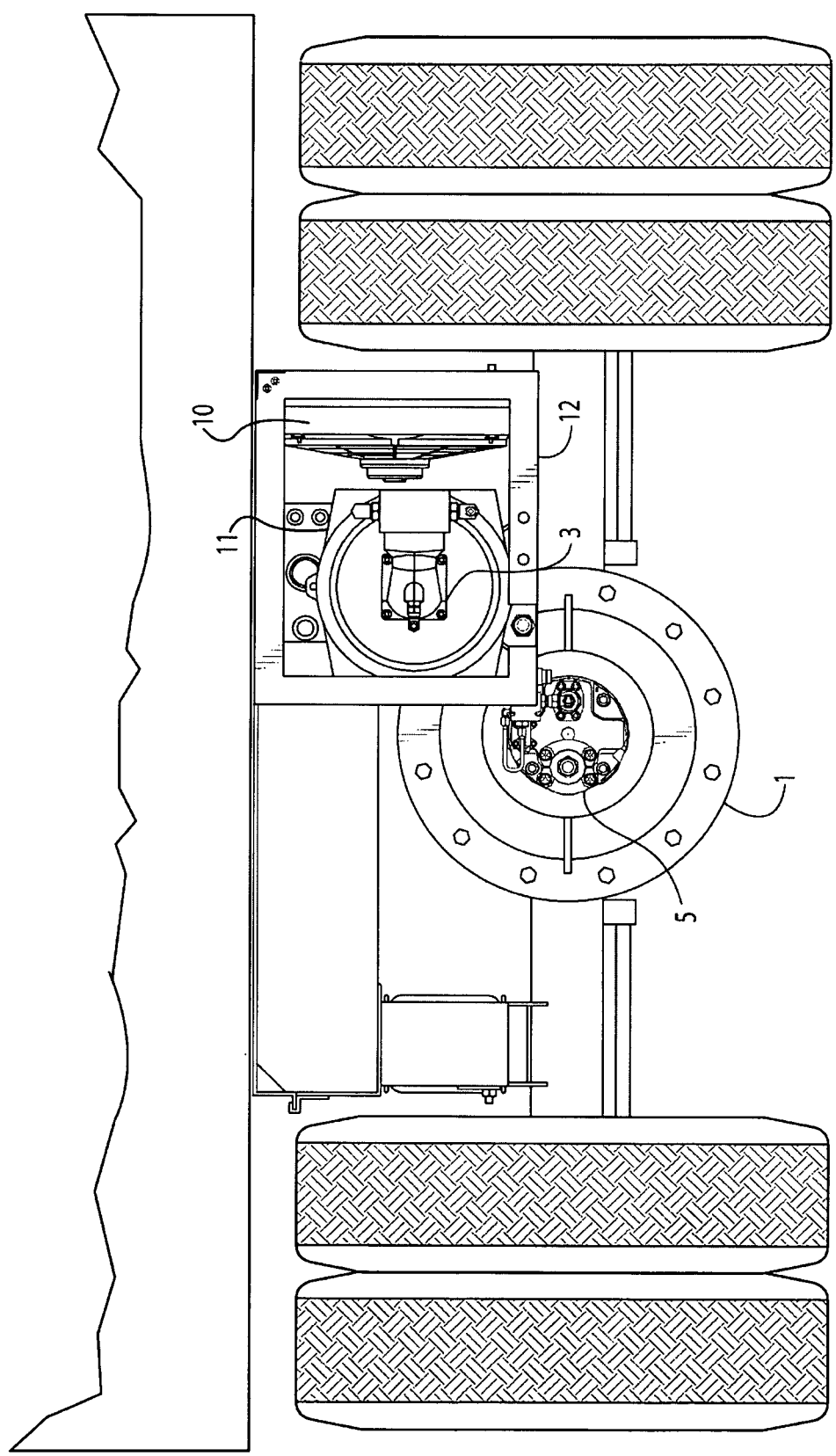
FIG. 2 is a view of the preferred embodiment of the invention from the front of the trailer.
Figure 3:
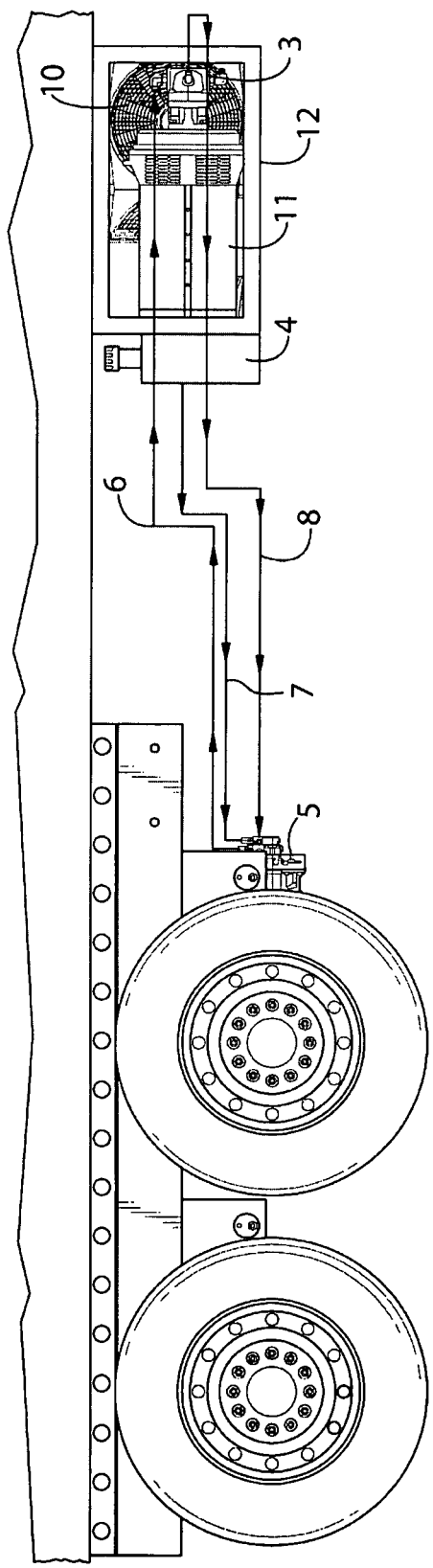
FIG. 3 is a side view of the preferred embodiment of the invention.
Figure 4:
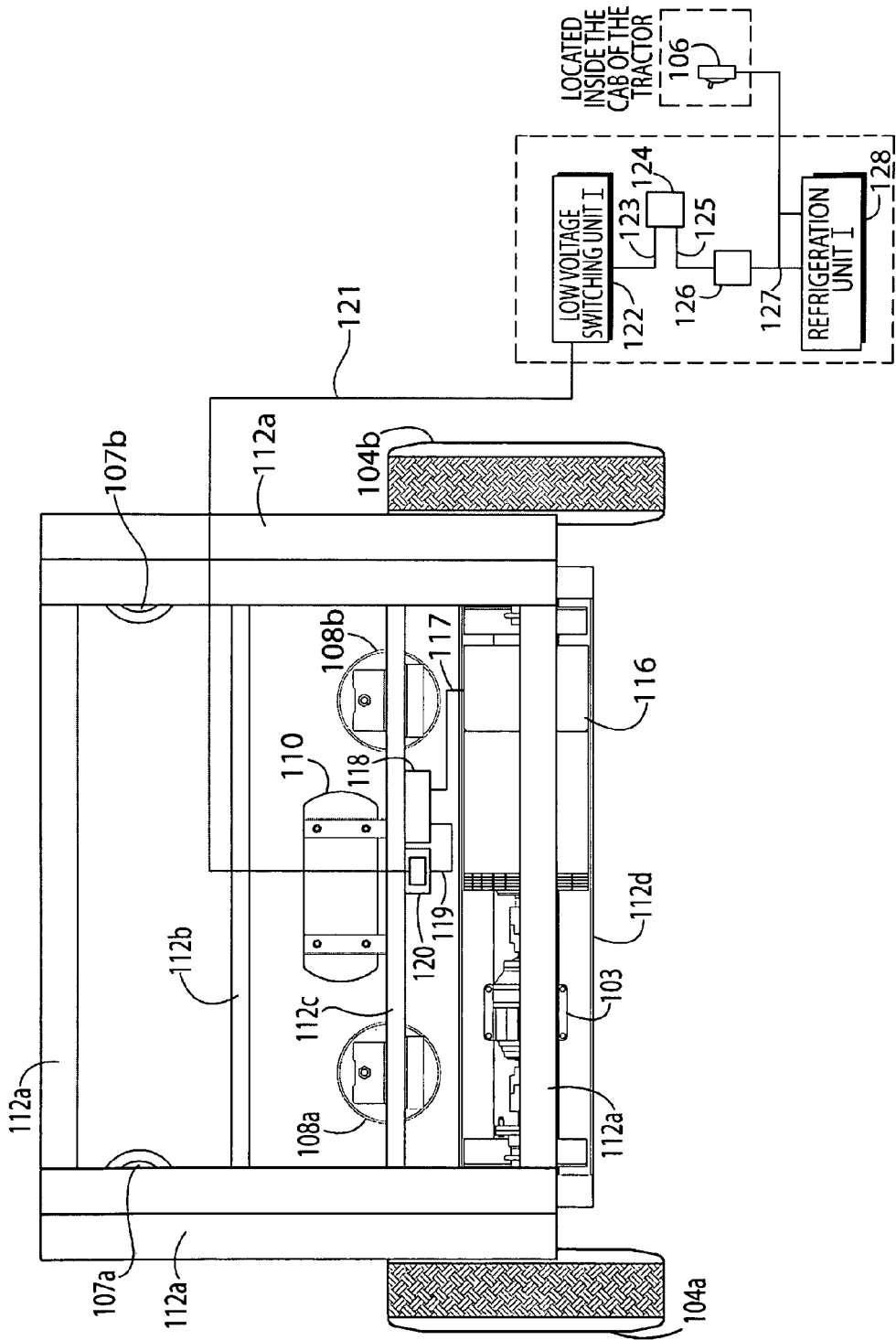
FIG. 4 represents a plan view, combined with a schematic diagram, of an alternate embodiment of the invention.
Figure 5:
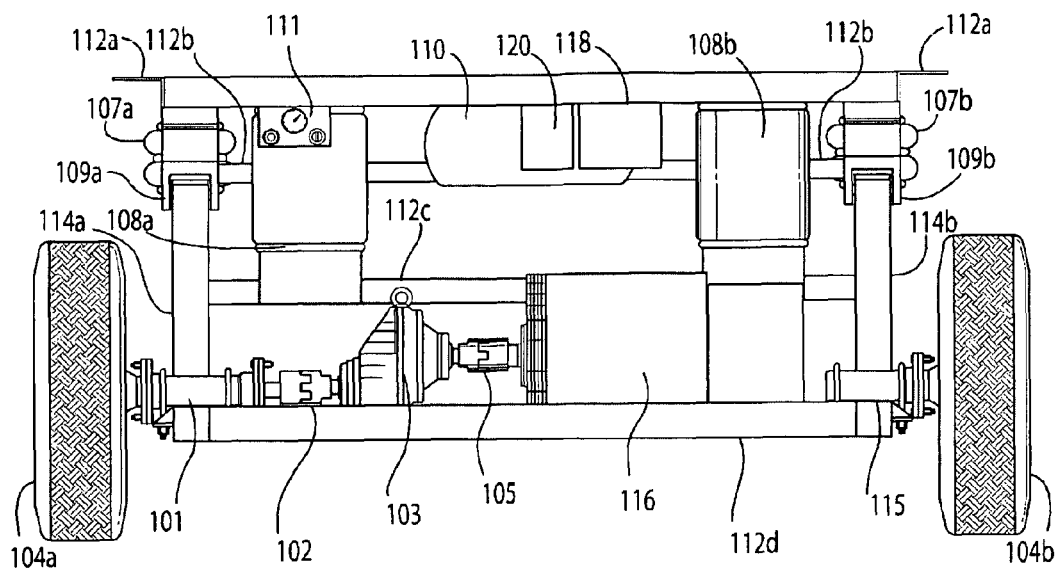
FIG. 5 represents a view of the alternate embodiment of the invention, from the back end of the trailer.
Figure 6:
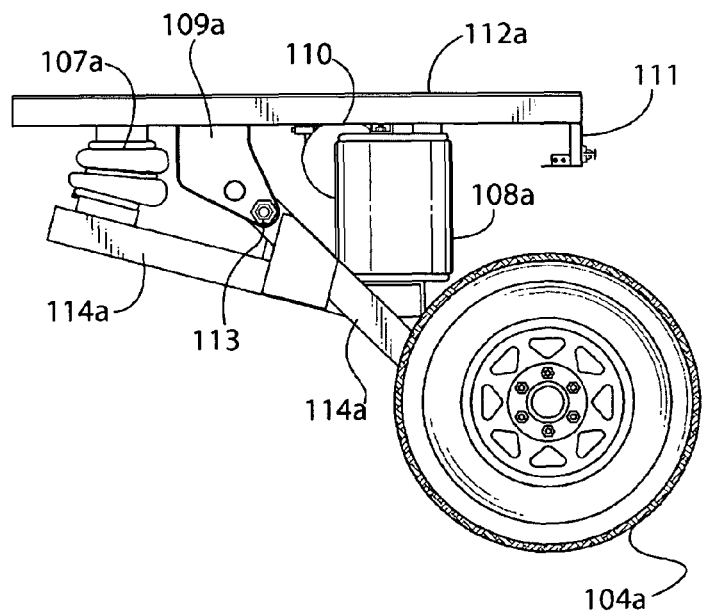
FIG. 6 represents a side view of a portion of a carriage assembly that affords a lifting and lowering mechanism for the alternate embodiment.

The preferred embodiment of the invention herein comprises a Drive Assembly II, a Generator Assembly, a Hydraulic Assembly, an Electrical Assembly II, and a Refrigeration Assembly II.

The Drive Assembly II comprises a Third Member Differential Drive Unit (TMDUU) (1) and a Differential Coupler (2).

The Generator Assembly comprises a Power Take-Off (PTO) Electricity Generator II Unit Housing (12) and a PTO Electricity Generator II (11) located within the PTO Electricity Generator II Unit Housing.

The Hydraulic Assembly comprises a Hydraulic Drive Motor (HDM) (3) coupled directly with the PTO Electricity Generator II and located within the PTO Electricity Generator II Unit Housing, a Hydraulic Fluid Reservoir (4) affording a hydraulic fluid pressure system, a Variable Speed Drive Hydraulic Pump (VSDHP)(5) that is coupled to the TMDUU by the Differential Coupler, a Hydraulic Fluid Pressure Line (6) carrying hydraulic fluid and connecting the VSDHP with the HDM, a Hydraulic Fluid Suction Line (7) carrying hydraulic fluid and connecting the Hydraulic Fluid Reservoir and the VSDHP, a Hydraulic Fluid Case Drain Line (8) carrying hydraulic fluid and connecting the HDM and the VSDHP, a VSDHP Assembly Support (9), and a Hydraulic Fluid Cooling Radiator (10) located within the PTO Electricity Generator II Unit Housing. The HDM is engaged with and rotates a shaft in the PTO Electricity Generator II.

The Electrical Assembly II comprises a Power Lead-In Line EBP II (13) connecting the PTO Electricity Generator II with an Electrical Breaker Panel II (14), a Power Lead-In Line LVSU II (15) connecting the Electrical Breaker Panel II with a Low Voltage Switching Unit II (16), a Power Lead-In Line IPS II (17) connecting the Low Voltage Switching Unit II with an Inverter Power Switch II (18), and a Power Lead-In Line TDS II (19) connecting the Inverter Power Switch II to a Time Delay Switch II (20). The Electrical Breaker Panel I is a sixty (60) amp circuit breaker panel.

The Refrigeration Assembly II comprises a Power Lead-In Line II RU (21) connecting the Time Delay Switch to a Refrigeration Unit II (22).

The Refrigeration Unit II, commonly known in the art, is comprised of a diesel engine, an electricity generator driven by the diesel engine, and a compressor that compresses a refrigerant in the Refrigeration Unit II, thereby providing cooling. The diesel engine, the electricity generator driven by the diesel engine, and the compressor are not depicted in the drawings as they are commonly known in the art. When the diesel engine is operating, it provides power to the electricity generator, which in turn provides power to the compressor. As more fully explained herein, when the Regenerative Electric Drive Refrigerated Unit is operating, the diesel engine is shut off and not running so that power to the compressor is directly supplied by the Regenerative Electric Drive Refrigerated Unit, thereby conserving energy and reducing air pollution.

In the preferred embodiment of the invention disclosed herein, the Regenerative Electric Drive Refrigerated Unit contemplates replacing an existing axle of the trailer unit. A Third Member Differential Drive Unit (TMDDU) is integrated into an axle, preferably the front axle, of the trailer unit. The TMDDU is similar to the differential assemblies widely known in the motor vehicle industry. The TMDDU is fitted with the Differential Coupler that will allow the adaptation of a Variable Speed Drive Hydraulic Drive Pump (VSDHP) to be powered from the rotations of the TMDDU. The VSDHP is mounted to the front of the TMDDU with the VSDHP Assembly Support, specially designed brackets supporting the VSDHP. This mounting allows free movement of the VSDHP unit in conjunction with the suspension movements of the TMDDU. The VSDHP supplies hydraulic fluid pressure via the Hydraulic Fluid Pressure Line to the Hydraulic Drive Motor located within the PTO Electricity Generator II Unit Housing. This PTO Electricity Generator II Unit Housing also includes the Hydraulic Fluid Cooling Radiator and the PTO Electricity Generator II. The VSDHP obtains its needed hydraulic fluid from the Hydraulic Fluid Reservoir via the Hydraulic Fluid Suction Line which allows the driving of the Hydraulic Drive Motor by the provision of hydraulic fluid pressure through the Hydraulic Fluid Pressure Line. The Hydraulic Fluid Pressure Line delivers the needed hydraulic fluid pressure to the HDM. In the event that there is excess pressure and fluid delivered to the HDM, then the excess fluid under pressure is returned to the VSDHP via the Hydraulic Fluid Case Drain Line.

The VSDHP is driven by the motion of the wheels of the tractor/trailer, which in turn rotate an axle upon which said wheels are mounted, activating the TMDDU through the Differential Coupler. The VSDHP in turn drives the HDM via hydraulic pressure. The HDM directly drives the PTO Electricity Generator II. The HDM rotates consistently at 1800 rotations per minute (RPMs) with a ground speed range of the tractor/trailer from twenty-five (25) to seventy-five (75) miles per hour (MPH). This consistency of rotation at varying tractor/trailer speeds within the specified speed range is maintained by hydraulic pressure.

This consistency of 1800 RPMs for the HDM with speeds of the tractor/trailer ranging from twenty-five to seventy-five MPH is accomplished because the VSDHP is designed to maintain an output at the required 1800 RPMs within the tractor/trailer specified tractor/trailer speed range of twenty-five (25) to seventy-five (75) miles per hour (MPH). Because the HDM is directly coupled with the PTO Electricity Generator II, when a shaft of the HDM rotates at 1800 RPMS, it drives the shaft to which it is connected of the PTO Electricity Generator II at the same 1800 RPMs. When the PTO Electricity Generator II rotates at the specified 1800 RPMS, then the PTO Electricity Generator II supplies to the Refrigeration Unit II an electrical output of 240 v/3 ø/60 Hz, that is, 240 volts, 3 phase, and 60 Hertz (cycles per second), which is the electrical operating requirement for the Refrigeration Unit II.

The PTO Electricity Generator II then sends power to the Electrical Breaker Panel II, which in turn is connected to the Low Voltage Switching Unit II. The Low Voltage Switching Unit II regulates the system's electrical needs. The Low Voltage Switching Unit II in turn is connected to the Inverter Power Switch II. The Inverter Power Switch II is connected with the Time Delay Switch II. When the electrical output from the PTO Electricity Generator II falls below the required operating level of the Refrigeration Unit II, then the diesel engine is signaled by the Inverter Power Switch II and engaged, i.e., started and running, to fulfill the power requirements of the Refrigeration Unit II. A Time Delay Switch II, which is connected to the Refrigeration Unit II, helps to prevent sudden surges when the diesel engine is powered up or down. It also prevents frequent power cycling of the diesel engine generator and ensures there is never too much pressure on the compressor unit of the Refrigeration Unit II.

When the output of the PTO Electricity Generator II is sufficient, then the Inverter Power Switch II signals the diesel engine to stop and the diesel engine ceases to run.

Those of ordinary skill in the art could readily adopt a variable speed transmission to regulate the output of the TMDDU so that the required RPMs are delivered and remain consistent with different speeds of the tractor/trailer.

Another embodiment of the invention comprises a Drive Assembly I, a Carriage Assembly, an Electrical Assembly I, and a Refrigeration Assembly I.

The Drive Assembly I comprises a Drive Wheel Axle (101), an Axle to Transmission Coupler (102), a Step-Up Transmission (103), a Drive Wheel (104a), a Carrier Wheel (104b), and a Transmission to PTO Electricity Generator I Coupler (105).

The Carriage Assembly comprises an Activation Switch (106), a Drive Side Lift Air Bag (107a), a Carrier Side Lift Air Bag (107b), a Drive Side Suspension Air Bag (108a), a Carrier Side Suspension Air Bag (108b), a Drive Side Swing Arm Hanger (109a), a Carrier Side Swing Arm Hanger (109b), an Air Tank (110), a Lift Air Bag Controller Valve (111), a Carriage Support (112a), a Carriage Support Pivot Brace (112b), a Carriage Support Swing Arm Brace (112c), a Carriage Support Axle Mount (112d), a Drive Side Swing Arm Pivot (113), a Carrier Side Swing Arm Pivot (not pictured), a Drive Side Swing Arm (114*a*), a Carrier Side Swing Arm (114*b*), and a Carrier Wheel Axle (115).

The Electrical Assembly I comprises a Power Take-Off (PTO) Electricity Generator I (116), a Power Lead-In Line VR I (117) connecting the PTO Electricity Generator I to a Voltage Regulator (118), a Power Lead-In Line EBP I (119) connecting the voltage Regulator to an Electrical Breaker Panel I (120), a Power Lead-In Line LVSU I (121) connecting the Electrical Breaker Panel I to a Low Voltage Switching Unit I (122), a Power Lead-In Line IPS I (123) connecting the Low voltage Switching Unit I to an Inverter Power Switch I (124), and a Power Lead-In Line TDS I (125) connecting the Inverter Power Switch to a Time Delay Switch I (126).

The Refrigeration Assembly I comprises a Power Lead-In Line I RU (127) connecting the Time Delay Switch to a Refrigeration Unit I (128).

The Activation Switch is located inside the cab of the tractor and, when engaged or disengaged, activates the Carriage Assembly and Drive Assembly I by either engaging or disengaging, respectively, the Drive Wheel and Carrier Wheel with the road surface. It is electrically connected indirectly with the Refrigeration Unit I through the Power Lead-In Line RU I.

The Refrigeration Unit I, commonly known in the art, is comprised of a diesel engine, an electricity generator driven by the diesel engine, and a compressor that compresses a refrigerant in the Refrigeration Unit I, thereby providing cooling. The diesel engine, the electricity generator driven by the diesel engine, and the compressor are not depicted in the drawings as they are commonly known in the art. When the diesel engine is operating, it provides power to the electricity generator, which in turn provides power to the compressor. When the Regenerative Electric Drive Refrigerated Unit is operating, the diesel engine is shut off and not running so that power to the compressor is directly supplied by the Regenerative Electric Drive Refrigerated Unit, thereby conserving energy and reducing air pollution.

The Carriage Support, Carriage Support Pivot Brace, Carriage Support Swing Arm Brace, and Carriage Support Axle Mount provide a frame for the Drive Assembly I and the remainder of the Carriage Assembly to facilitate an air ride suspension and a pneumatic lifting system, providing for optimum contact of the Drive Wheel and Carrier Wheel with the road surface, thereby affording sufficient friction between said Drive Wheel and Carrier Wheel, on the one hand, and the road surface on the other hand, to facilitate rotation and not skidding of said Drive Wheel and Carrier Wheel. The Carriage Assembly provides for the ability to lift and remove the Drive Wheel and Carrier Wheel from contact with the road surface when not in operation. This lifting and removing the Drive Wheel and Carrier Wheel from contact with the road surface, or the lowering of the Drive Wheel and Carrier Wheel and providing contact of said Wheels with the road surface, are actuated by the Activation Switch.

Although in this embodiment the Carriage Assembly uses a pneumatic system, one of ordinary skill in the art may readily adapt a hydraulic fluid pressure system to raise and lower the Carriage Assembly.

The Drive Side Lift Air Bag, the Carrier Side Lift Air Bag, the Drive Side Swing Arm Hanger, the Carrier Side Swing Arm Hanger, the Air Tank, and the Lift Air Bag Controller Valve are each mounted to the Carriage Support. The Drive Side Suspension Air Bag and the Carrier Side Suspension Air Bag are mounted to and between the Carriage Support and the Carriage Support Swing Arm Brace. The Drive Wheel Axle and the Carrier Wheel Axle are adapted to the Carriage Support Axle Mount so that both Axles rotate freely when the Drive Wheel and Carrier Wheel are in contact with the road surface.

The Carrier Wheel Axle and the Drive Wheel Axle are mounted on the Carrier Side Swing Arm and the Drive Side Swing Arm, respectively, so that said Axles may rotate with the rotation of the Drive Wheel and the Carrier Wheel. The Drive Side Swing Arm Hanger and the Carrier Side Swing Arm Hanger pivot about the Drive Side Swing Arm Pivot and the Carrier Side Swing Arm Pivot, respectively, of the Drive Wheel and the Carrier Wheel, respectively, allowing the Drive Wheel and the Carrier Wheel to be lifted from or lowered to contact with the road surface.

The Drive Side Lift Air Bag and Carrier Side Lift Air Bag connect the Drive Side Swing Arm and the Carrier Side Swing Arm, respectively, to the Carriage Support. The Lift Air Bags lift and lower the Swing Arms so that the Carrier Wheel and Drive Wheel may be lifted from or lowered to contact with the road surface. The Drive Side Suspension Air Bag and the Carrier Side Suspension Air Bag provide for shock absorption for the Carriage Support, thereby helping to dampen shock and vibration through the Carriage Support Axle Mount when the Carrier Wheel and Drive Wheel are in contact with the road surface. The Air Tank provides pneumatic pressure for the Lift Air Bags and the Suspension Air Bags. The Lift Air Bag Controller Valve regulates the air pressure directed to the Lift Air Bags, thereby allowing the lifting or lowering of the Carriage Support.

The Axle to Transmission Coupler couples the Drive Wheel Axle with the Step-Up Transmission, which has a 1:2.48 gear ratio. The Electrical Breaker Panel I is a sixty (60) amp circuit breaker panel.

The Carriage Assembly places the Drive Wheel and the Carrier Wheel in contact with the road surface so that surface friction is sufficient to ensure that the Drive Wheel and Carrier Wheel rotate rather than skid across the road surface. The Carriage Assembly provides the desired amount of pressure to allow for maximum ground driven power of the Drive Wheel and Carrier Wheel by virtue of their contact with the road surface. The Activation Switch allows an operator to raise and lower the Carriage Assembly. The Drive Wheel and Carrier Wheel are placed into contact with the road surface when the Activation Switch is engaged and lifted from contact with the road surface when the Activation Switch is disengaged. The lifting and lowering capabilities of the Carriage Assembly are controlled by the Lift Air Bag Controller Valve, which prevents over-inflation of the Lift Air Bags and allows the Drive Assembly I and Carriage Assembly to be lifted, thereby removing the Drive Wheel and Carrier Wheel from contact with the road surface and providing maximum road surface clearance when not in use.

The Drive Wheel and Carrier Wheel are stock sixteen inch (16") load range E tires inflated to approximately 85 pounds per square inch (PSI). The Drive Wheel and the Carrier Wheel have separate axles, the Drive Wheel Axle and the Carrier Wheel Axle, respectively.

The Drive Wheel Axle is set in motion by the Drive Wheel when the Drive Wheel is in contact with the road surface. Rotation of the Drive Wheel causes rotation of the Drive Wheel Axle, which in turn causes rotation of a shaft in the Step-Up Transmission, coupled to the Drive Wheel Axle by the Axle to Transmission Coupler.

The Step-Up Transmission increases output RPMs at a ratio of one revolution per minute (RPM) input (of the Drive Wheel Axle) to an output of 2.48 RPMs. The Step-Up Transmission is coupled to the PTO Electricity Generator I via the Transmission to PTO Electricity Generator I Coupler, causing a shaft in the PTO Electricity Generator I to rotate, thereby facilitating the production of electricity by the PTO Electricity Generator I.

The PTO Electricity Generator I then sends power to the Voltage Regulator, which is electrically connected with the Electrical Breaker Panel I. The Electrical Breaker Panel I is connected to the Low Voltage Switching Unit I, which regulates the system's electrical needs. The Low Voltage Switching Unit I is connected to the Inverter Power Switch I, which in turn is connected with the Time Delay Switch I. When the electrical output from the PTO Electricity Generator I falls below the required operating level of the Refrigeration Unit I, then the diesel engine is signaled by the Inverter Power Switch I and engaged, i.e., started and running, to fulfill the power requirements of the Refrigeration Unit I. The Time Delay Switch I helps to prevent sudden surges when the diesel engine is powered up or down. It also prevents frequent power cycling of the diesel generator and ensures that there is never too much pressure on the compressor unit of the Refrigeration Unit I.

When the electrical output of the PTO Electricity Generator I is sufficient, then the Inverter Power Switch I signals the diesel engine to stop and the diesel engine ceases to run.

The optimum operating range of the PTO Electricity Generator I is effected when the speed of the tractor/trailer is from 63 to 67 miles per hour (MPH). If the speed drops below 63 MPH, then the system is not capable of producing the needed RPMs for required electrical output of the PTO Electricity Generator I. The diesel engine is then signaled by the Inverter Power Switch I to start and run.

Those of ordinary skill in the art could readily adopt a variable speed transmission to regulate the output of the TMDDU so that the required RPMs are delivered and remain consistent with different speeds of the tractor/trailer.

What is claimed is:

1. A regenerative electric drive refrigerated unit for a conveyance vessel comprising:
    a refrigeration unit with a compressor unit that compresses a refrigerant in the refrigeration unit, thereby providing cooling to a compartment in the conveyance vessel;
    a diesel engine that powers the compressor unit;
    drive means enabled by movement of the conveyance vessel;
    coupling means engaged with said drive means and coupling hydraulic means with said drive means;
    support means for supporting said hydraulic means and said coupling means, said support means allowing free movement of said coupling means and said hydraulic means with movement of the drive means;
    an electricity generator driven by said hydraulic means, adapted to said hydraulic means such that the electricity generator is enabled to generate electricity;
    means for stopping said diesel engine and applying the generated electricity to the compressor unit when the diesel engine is stopped and not running; and
    means for starting said diesel engine and discontinuing the application of the generated electricity to the compressor unit when the diesel engine is started and running.

2. A regenerative electric drive refrigerated unit for a conveyance vessel as claimed in claim 1, wherein said means for stopping said diesel engine and applying the generated electricity to the compressor unit when the diesel engine is stopped and not running, and said means for starting said diesel engine and discontinuing the application of the generated electricity to the compressor unit when the diesel engine is started and running, comprises:
    an electrical breaker panel electrically connected with the electricity generator;
    a switching unit electrically connected with the electrical breaker panel;
    a power switch electrically connected with the switching unit;
    a time delay switch electrically connected with the power switch; and
    the refrigeration unit electrically connected with the time delay switch;
    whereby an electrical signal is provided to the diesel engine to stop and cease running, facilitating the application of the generated electricity to the compressor unit when the diesel engine is stopped and not running, and discontinuing the application of the generated electricity to the compressor unit when the diesel engine is started and running.

* * * * *